United States Patent [19]

Baba et al.

[11] Patent Number: 5,732,655
[45] Date of Patent: Mar. 31, 1998

[54] AUTOMATIC FEEDING APPARATUS FOR AQUATIC LIFE, AND A METHOD FOR USING SAME

[75] Inventors: Kenji Baba; Ichiro Embutsu; Akira Miyashiro, all of Hitachi; Bunji Yoshitomi, Hachioji, all of Japan

[73] Assignee: Hitachi, Ltd., Tokyo, Japan

[21] Appl. No.: 814,450

[22] Filed: Mar. 10, 1997

[30] Foreign Application Priority Data

Mar. 27, 1996 [JP] Japan ................... 8-097766

[51] Int. Cl.$^6$ ............................................. A01K 61/00
[52] U.S. Cl. .................................................... 119/230
[58] Field of Search ................................ 119/230, 215, 119/269, 216

[56] References Cited

U.S. PATENT DOCUMENTS

| | | | |
|---|---|---|---|
| 3,523,520 | 8/1970 | Evans | 119/230 X |
| 4,379,427 | 4/1983 | Knowles | 119/230 |
| 4,534,317 | 8/1985 | Walsh | 119/230 X |
| 5,076,215 | 12/1991 | Yang | 119/230 X |
| 5,133,287 | 7/1992 | Hicks | 119/230 |
| 5,337,698 | 8/1994 | Widmyer | 119/230 X |

*Primary Examiner*—Thomas Price
*Attorney, Agent, or Firm*—Kenyon & Kenyon

[57] ABSTRACT

An automatic feeding apparatus for aquatic life comprising a cultivating device 20 for cultivating the aquatic life 10, and a feeding device 80 for supplying food, which further comprises an image acquisition device 40A for taking an image of wave forms at surface of water 30 in the cultivating device, an image processing device 50 for processing the image to a binary image, an activity calculating device 60 for calculating a value indicating the activity of the aquatic life by calculating a total number and/or a total area of the wave forms based on the binary image, a feeding amount control device 70 for controlling feeding amount and feeding time of the feeding device based on the value, and a device 110, 40B for adjusting the feeding amount based on cultivation environment and/or number and size of the aquatic life.

12 Claims, 6 Drawing Sheets

AUTOMATIC FEEDING APPARATUS FOR AQUATIC LIFE, AND A METHOD FOR USING SAME

BACKGROUND OF THE INVENTION

The present invention relates to an automatic feeding apparatus for aquatic life, and to a method for using same. Especially, the present invention relates to an automatic feeding apparatus for aquatic life such as fish in a fish farm, wherein an amount of feeding food is controlled appropriately corresponding to a required amount of food by the aquatic life in accordance with measurement and analysis of a degree of activity of the aquatic life by an image processing.

Generally speaking, an appropriate amount of food for the aquatic life is determined corresponding to weight of the object aquatic life in a closed environmental water area wherein the aquatic life is cultivated. The object cultivated aquatic life can grow up favorably, if the appropriate amount of food is fed in an appropriate interval.

Usually, feeding to the aquatic life is performed by a feeding worker, i.e. a feeder. Therefore, how the appropriate amount of food is fed in a day is determined by the feeder. In the above case, the feeder uses the activity of the aquatic life, that is, behavior of the object aquatic life in water, as a major basis for determining the appropriate feeding food. For instance, in a case of main cultivated fishes in sea water, the object fishes are generally significantly active in taking food at surface or 2~3 meters beneath the surface of the sea water in the initial period of feeding, that is, a period when the object fishes have an active requirement for food. In accordance with decreasing the requirement for food of the object fishes in the intermediate period and the last period of the feeding, the fish group moves down gradually to deeper portion beneath the surface of sea water, and finally, the fishes stop to take food even the feeding is continued, and a degree of motion (activity) is decreased.

The feeder feeds the cultivated fishes with concurrently observing the typical behavior of the object fishes for taking food.

One of fundamentals of the feeding is to feed evenly to all respective fishes in the object fish group, and to make a percentage of fishes which took the food (a rate of taking food) closer to 100 per cent as possible. However, actually, it is very difficult to realize the above described job.

The first reason of the difficulty is a problem of feeding skill of the feeder. An expert feeder performs the feeding in sufficient consideration of not only the behavior of the object aquatic life in water, but also atmospheric temperature, water temperature, climate, and others. The aquatic life, for instance, fishes fed by the expert feeder have a narrow width in a weight distribution, because the food is fed evenly to all respective of the fishes in the group. An average weight of the fishes in the group is larger than that of other groups, and a preferable rate of taking food of the fishes is realized. However, even in this case, the rate of taken food by fish is far less than 100 per cent, practically estimated as approximately 80 per cent, and the rest 20 per cent food is flowed away from the fish preserve, and causes pollution of the fishing sea.

The second reason of the difficulty is a restriction of available time of the feeder. In accordance with current prosperity of cultivation industry, the scale of the cultivation grows gradually, and a time of the feeder available for feeding to the object cultivated aquatic life has been restricted. In order to solve the above problem, various automatic feeding apparatus have been commercialized. However, most of the automatic feeding apparatus in the market are in a type wherein a definite amount of food is fed with a predetermined time interval by setting a timer, as disclosed in JP-A-63-98334 (1988), and food requirement of the object cultivated aquatic life has been hardly considered. Accordingly, the rate of the aquatic life which took the food when the automatic feeding apparatus is used is far lower than the case when an expert feeder feeds.

The third reason is based on difficulty in sufficiently observing behavior of the object aquatic life in water when food is fed. Generally speaking, the feeder feeds the food to a bunch of the object cultivated aquatic life from above the surface of water. In the above case, the feeder can observe exactly the behavior of the fishes only in a very shallow range under the surface of the water, and observation of group distribution of the cultivated aquatic life in a depth direction (a perpendicular direction to the surface of water), which relates directly to the food requirement of the object cultivated aquatic life, is very difficult.

Because the conventional methods for feeding food to the cultivated aquatic life have been performed based mainly on an individual sense and experience of the feeder, various problems such as a low percentage of the object cultivated aquatic life which took the food, increase in cost, increase in man-hour labor for long duration of feeding work, pollution of environmental water, and others are caused. Especially, pollution of fishing sea becomes a world wide problem.

SUMMARY OF THE INVENTION

In view of the above circumstances, one of the objects of the present invention is to provide an automatic feeding apparatus for aquatic life and a method for using the same, which are preferable for realizing the automatic feeding with an appropriate amount of food, a high percentage of aquatic life which took the food, decrease in cost of the food, decrease in man-hour labor, and prevention of the environmental water pollution, by image-processing of the behavior of the cultivated aquatic life.

The above object can be achieved by the automatic feeding apparatus of the present invention, which comprises an image acquisition means for taking the activity of the cultivated aquatic life as an image, an image processing means for calculating the image into a binary image, an activity calculating means for calculating a value indicating the activity of the cultivated aquatic life from the binary image, a feeding amount control means for controlling the feeding amount and feeding time based on the calculated value indicating the activity, and a feeding means for feeding an appropriate amount of food at an adequate time interval based on the control by the above feeding amount control means.

The above object can be also achieved by the method of the present invention, which comprises the steps of acquiring the object cultivated aquatic life as an image, calculating the image into a binary image by image processing, calculating a value indicating the activity of the cultivated aquatic life using the result of the above image processing, and feeding the cultivated aquatic life with controlling the feeding amount and feeding time based on the above value.

The activity of the cultivated aquatic life can be taken as an image of wave form at surface of the water, and a value indicating the activity of the cultivated aquatic life can be calculated from a binary image obtained from the image of the wave forms as a total number of the wave forms and/or a total area of the wave forms.

Furthermore, the activity of the cultivated aquatic life can be taken also as an image of the aquatic life itself in water, and a value indicating the activity of the cultivated aquatic life can be calculated from a distribution of the cultivated aquatic life in a depth direction and/or a degree of moving velocity of the cultivated aquatic life.

The feeding amount can be controlled by providing a feeding environment measuring means and/or a measuring means for the number and size of the cultivated aquatic life, and based on the number and size of the feeding environment and/or the number and size of the cultivated aquatic life.

The above object can be also achieved by the automatic feeding apparatus of the present invention, which comprises an image acquisition means for taking an image of wave forms at surface of water of cultivating means, an image processing means for calculating a binary image from the image of the wave forms at surface of the water, an activity calculating means for calculating a value indicating the activity of the cultivated aquatic life with a total number of the wave forms and/or a total area of the wave forms from the binary image, a feeding amount control means for controlling the feeding amount based on a comparison of the above calculated value with pre-determined value for the total number of the wave forms and/or the total area of the wave forms, and a feeding means for feeding an appropriate amount of food based on the control by the above feeding amount control means.

The above object can be also achieved by the method of the present invention, which comprises the steps of taking an image of wave forms at surface of water in aquafarm for cultivating the aquatic life, calculating a binary image from the image of the wave forms at surface of the water by image processing, calculating a value indicating the activity of the cultivated aquatic life with a total number of the wave forms and/or a total area of the wave forms from the binary image, controlling the feeding amount based on a comparison of the above calculated value with pre-determined values for the total number of the wave forms and/or the total area of the wave forms, and feeding an appropriate amount of food based on the control by the above feeding amount control means.

In accordance with the present invention, an appropriate amount of food is always fed, a percentage of the aquatic life which took the food is increased, cost of the food is decreased, feeding work can be performed efficiently, and environmental water pollution can be mitigated, because feeding is performed automatically based on the activity value which is obtained by image analysis of variation in the degree of requiring for food (food requirement) of respective group and body of the cultivated aquatic life, food taking activity of the cultivated aquatic life induced by the food requirement, and food taking activity of the cultivated aquatic life with decrease in the food requirement.

BRIEF DESCRIPTION OF THE DRAWINGS

These and other objects, features and advantages of the present invention will be understood more clearly from the following detailed description with reference to the accompanying drawings, wherein.

DESCRIPTION OF THE PREFERRED EMBODIMENT

Hereinafter, an embodiment of the present invention is explained referring to drawings.

Figure 1:
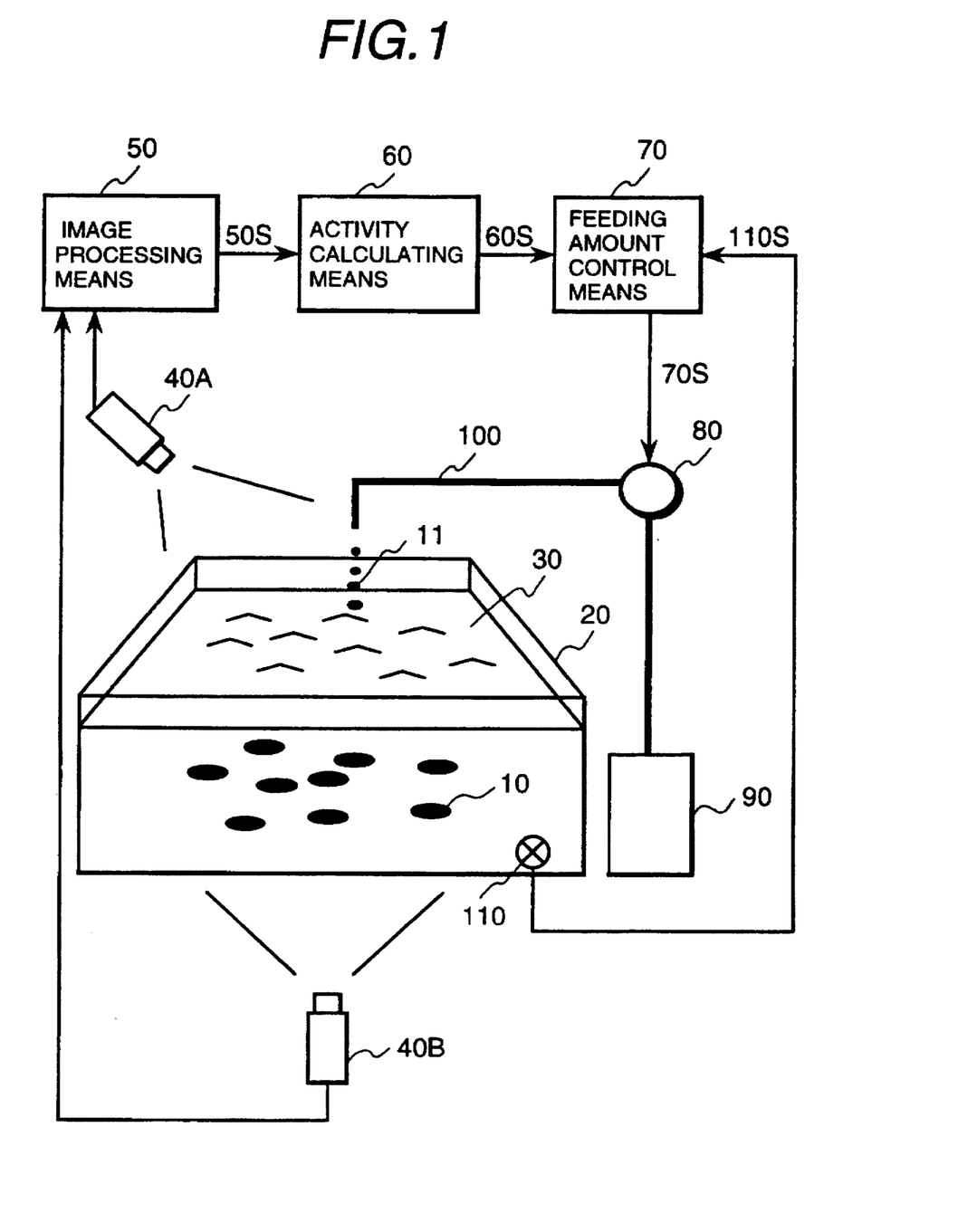
FIG. 1 is a schematic drawing indicating a total composition of an automatic feeding apparatus for cultivated aquatic life relating to an embodiment of the present invention.

FIG. 1 is a schematic drawing indicating a total composition of an automatic feeding apparatus for cultivated aquatic life relating to an embodiment of the present invention. In the present embodiment, fish is taken as an example of the aquatic life.

In FIG. 1, the numeral 10 indicates fishes, 11 is food, 20 is means for cultivating the fish 10, 30 is surface of water, 40A is image acquisition means for taking an image of the surface of water 30, 40B is image acquisition means for taking images of the fishes 10 in water, 50 is image processing means for processing the image and outputting an image processing signal 50S, 60 is activity calculating means for calculating the activity of fishes and outputting an activity signal 60S, 70 is feeding amount control means for outputting a feeding amount signal 70S based on the activity signal 60S and a cultivation environment measuring signal 110S, 80 is feeding means for supplying food 11 to fishes 10 from a feeding food tank 90 via a feeding pipe 100, 90 is the feeding food tank, and 110 is the cultivation environment measuring means for outputting the cultivation environment measuring signal 110S based on a season, atmospheric pressure, water temperature, dissolved oxygen concentration, and others, and adjusting the feeding amount signal 70S.

Hereinafter, details of the composition shown in FIG. 1 is explained.

The cultivation means 20 is a cultivation tank irrelevant to indoor or outdoor. The image acquisition means 40A takes a variable density image of wave by taking an image of the surface of water 30.

Figure 2:
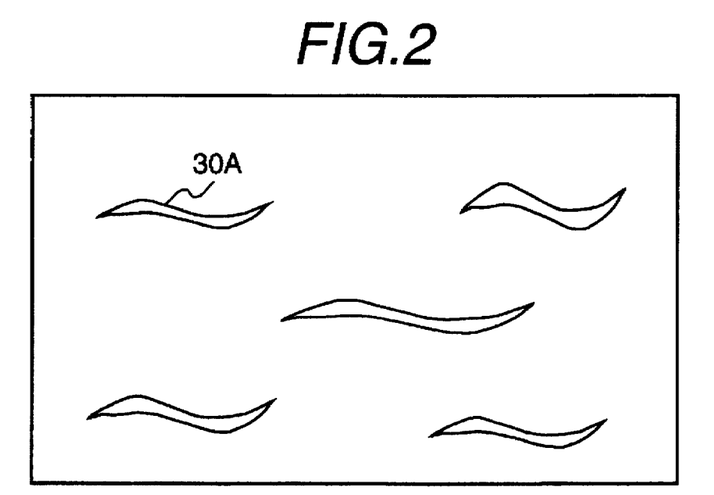
FIG. 2 is a schematic drawing for explaining binary images of wave forms.

The image processing means 50 calculates the variable density image of wave to binary values, and extracts wave forms and reflection at the surface of water based on the binary values. The binary values images are shown schematically in FIGS. 2-4. The wave forms 30A shown in FIG. 2 indicate waves at the surface of water without feeding the fishes. Feature of the wave forms 30A in FIG. 2 is a shape extending in a horizontal direction. The wave forms 30B shown in FIG. 3 indicate wave forms at feeding when small size fishes are cultivated. When small size fishes take food, the fishes splash small spray because of forming groups near surface in water, jumping out from the surface for taking food, and falling down into water for taking descending food. Therefore, the wave form at feeding 30B shown in FIG. 3 can be extracted as binary values image. The wave form at feeding 30B in FIG. 3 has a feature to increase in numbers in comparison with the wave form 30A shown in FIG. 2o The wave form 30C shown in FIGS. 3 and 4 indicate wave form at feeding when large size fishes are cultivated. When large size fishes take food, the fishes splash large spray because of waving crest. Therefore, the wave form at feeding 30C shown in FIG. 4 can be extracted as binary values image. The wave forms at feeding 30C shown in FIGS. 3 and 4 have a feature of increase in area in comparison with the wave form 30A shown in FIG. 2 and the wave form at feeding 30B shown in FIG. 3.

Therefore, in the present embodiment, the wave forms at feeding 30B and 30C are taken as indexes indicating a degree of food requirement by the groups of fish and respective fish in the group (food requirement), movement for taking food induced by the requirement (food taking movement), and variation of the movement for taking food due to decrease in the requirement for food (decrease in food requirement).

Figure 3:
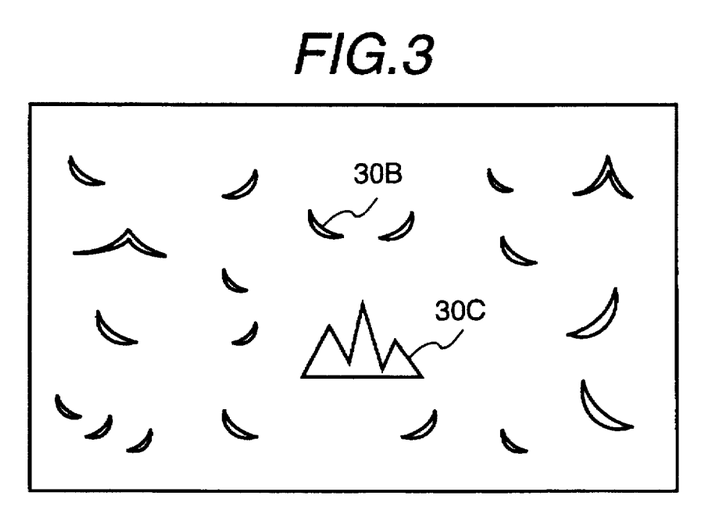
FIG. 3 is another schematic drawing for explaining binary images of wave forms.
Figure 4:
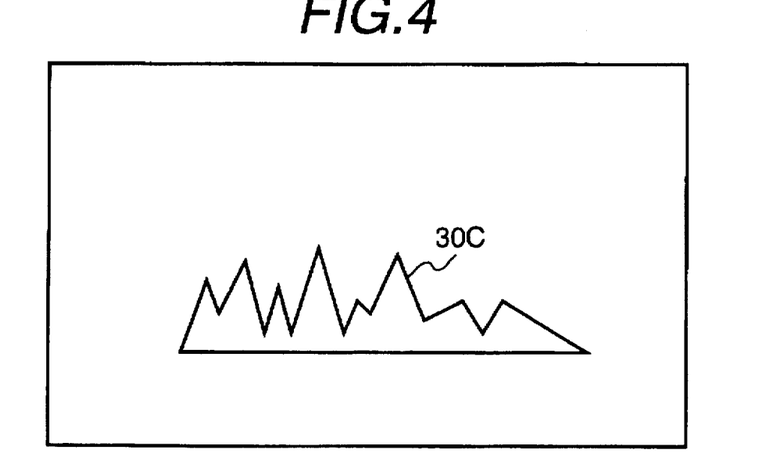
FIG. 4 is another schematic drawing for explaining binary images of wave forms.

Calculating the binary values means a process for separating a bright portion from a dark portion in an original image having nonuniform brightness. In accordance with the present embodiment, the bright portion (that is a wave crest) in the original image is expressed by a numeral "1", and the dark portion (that is water surface of the wave other than the crest) is expressed by a numeral "0". Therefore, the wave forms 30A, 30B, and 30C in FIGS. 2 and 3 are essentially white, and the background is black. However, for convenience in expression, the background is also expressed by white.

The activity calculating means 60 calculates the activity of fishes to values by taking the image processing signal 50S, which is obtained by calculating the wave forms 30B and 30C at feeding time into binary image, and calculating the total number 60SN of the wave forms 30B, or the total area 60SA of the wave forms 30C to obtain quantitatively the amount of the wave forms 30B and 30C at feeding time. In a case of small fishes, the more actively the fishes 10 move for taking food 11, the more the total number 60SN of the wave forms 30B increases. In a case of large fishes, the more actively the fishes 10 move for taking food 11, the more the total area 60SA of the wave forms 30C increases. However, even in the case of small fishes, there are some cases wherein both the wave forms 30B and 30C exist concurrently as shown in FIG. 3. In these cases, both the total number of wave forms 60SN and the total area of the wave forms 60SA are determined concurrently. For instance, the total number of wave forms 60SN can be obtained by summation of the numbers of wave forms 30B and 30C, and the total area of the wave forms 60SA can be obtained by summation of the areas of the wave forms 30B and 30C. In the present embodiment, the total number of wave forms 60SN and the total area of the wave forms 60SA are used as indexes indicating food requirement, a degree of movement for taking food, and variation of food requirement of fishes 10, and the indexes are explained together, hereinafter.

The feeding amount control means 70 calculates the amount of feeding food by taking the activity signal 60S which includes both the total number of wave forms 60SN and the total area of the wave forms 60SA. The larger the total number of the wave forms 60SN is, or the larger the total area of the wave forms 60SA is, the more the amount of feeding increases. Reversely, the smaller the total number of the wave forms 60SN is, or the smaller the total area of the wave forms 60SA is, the less the amount of feeding decreases. At the initial period of the feeding (taking food), the total number of wave forms 60SN, or the total area of the wave forms 60SA, is large. Therefore, an appropriate amount of feeding food is pre-determined.

The feeding means 80 supplies food 11 to fishes 10 in the cultivating means 20 from the feeding food tank 90 via a feeding pipe 100 by receiving the feeding amount signal 70S.

The cultivation environment measuring means 110 prepares the cultivation environment measuring signal 110S based on measurement information such as measured water temperature, measured dissolved oxygen concentration, and the others in order to control the feeding amount of food depending on season, atmospheric pressure, water temperature, dissolved oxygen concentration, and others, and adjusting the feeding amount signal 70S being output from the feeding amount control means 70. The amount of feeding food is somewhat increased when the water temperature and the dissolved oxygen concentration are adequate for growing the fishes. Reversely, when the above conditions are not adequate, the amount of feeding food is somewhat decreased. Furthermore, the amount of feeding food is adjusted seasonally in consideration of growing cycles of the fishes 10.

The amount of feeding food should be altered depending on the number and size of the fishes 10. Therefore, the number and the size of the fishes 10 are determined by the image acquisition means 40B for taking an image of the fishes 10 in water, and the feeding amount signal 70S is adjusted depending on the determined values. That means, the amount of feeding food is increased if the number of the fishes 10 is many and the size of the fishes 10 is large. The above method for measurement by the image acquisition means 40B for taking an image of the fishes 10 in water will be explained later in another embodiment.

Operation of the present embodiment is explained hereinafter referring to FIG. 5. Graphs in FIG. 5 indicate time in the abscissa, and respective of a degree of the total number of wave forms 60SN, a degree of the total area of wave forms 60SA, and the amount of feeding food in the ordinate.

At the start of the feeding, specified sound or light is generated and a small amount of food is fed first for stimulating food taking movement of fishes. At this point of time, the activity of the fishes 10 is remarkable, because the food requirement of the fishes 10 is large, and a large number of the wave forms 30B with small sprays and the wave forms 30C with large sprays and crests of wave are generated at the surface of water. Images of the wave forms 30B and 30C at feeding are taken by the image acquisition means 40A, and the wave images of light and shade are input into the image processing means 50. The activity of the fishes are calculated by calculating the wave images of light and shade into binary images by the wave processing means 50, and calculating quantitatively the total number 60SN of the wave forms 30B and the total area 60SA of the wave forms 30C by the activity calculating means based on the image processing signal 50S calculated to binary images. The total number 60SN of the wave forms 30B and the total area 60SA of the wave forms 30C at the initial period are large as shown in FIG. 5. The feeding amount control means 70 calculates the amount of feeding food in accordance with the received activity signal 60S, and concurrently, adjusting the calculated amount of feeding food based on the received cultivation environment measuring signal 110S from the cultivation environment measuring means 110, and the number and the size of the fishes 10 determined by the image acquisition means 40B. Then, the feeding amount control means 70 instructs the feeding means 80 to feed fishes 10 in the cultivating means 20 with food 11 by the amount of food 70S shown in FIG. 5 from a feeding food tank 90 via a feeding pipe 100. In accordance with continuing the feeding, the food requirement of the fishes 10 decrease gradually, and the degree of movement of fishes for taking food is decreased. According to the decrease, the number of the wave forms 30B for taking food at the surface of water 30 is decreased, and the area of the wave forms 30C is decreased. In the above case, the total number of the wave forms 60SN decreases gradually, and the total area of the wave forms 60SA also decreases gradually. In accordance with elapsing the feeding time, that means during the intermediate period (t1~t2) for feeding (taking food) and the last period (t2~t3) for feeding (taking food), the feeding amount 70S is decreased stepwise as shown in FIG. 5 corresponding to the degree of the total number 60SN and the total area 60SA, and finally the feeding is terminated. The feeding amount and the feeding time are controlled in accordance with the total number of the wave forms 60SN or the total area of the wave forms 60SA. If the decrease in the total number of the wave forms 60SN or the total area of the wave forms 60SA is rapid, the feeding is terminated early.

In accordance with the present embodiment, feeding the fishes can be performed always appropriately by calculating the wave forms at the surface of the water, which is generated corresponding to the food requirement of the fishes, the movement of the fishes for taking food induced by the food requirement, and variation in food taking movement of the fishes with decrease in the food requirement of the fishes, to binary images such as light and shade images by the image processing, calculating the activity of the fishes for taking food based on the binary images, and adjusting the amount of feeding food based on season, cultivating environment, growth degree of the fishes such as number and size of the fishes, and other conditions.

As the result, cost of the feeding food to the fishes can be decreased, and the water in the cultivating area can be prevented from pollution, because the amount of feeding food can be maintained at minimum but sufficiently, and remnant food can be decreased.

Furthermore, operator's labor for feeding the fishes can be decreased, and the feeding operation can be performed efficiently, because the amount of feeding food and the feeding time are controlled automatically corresponding to the variation in food taking movement of the fishes.

Figure 5:
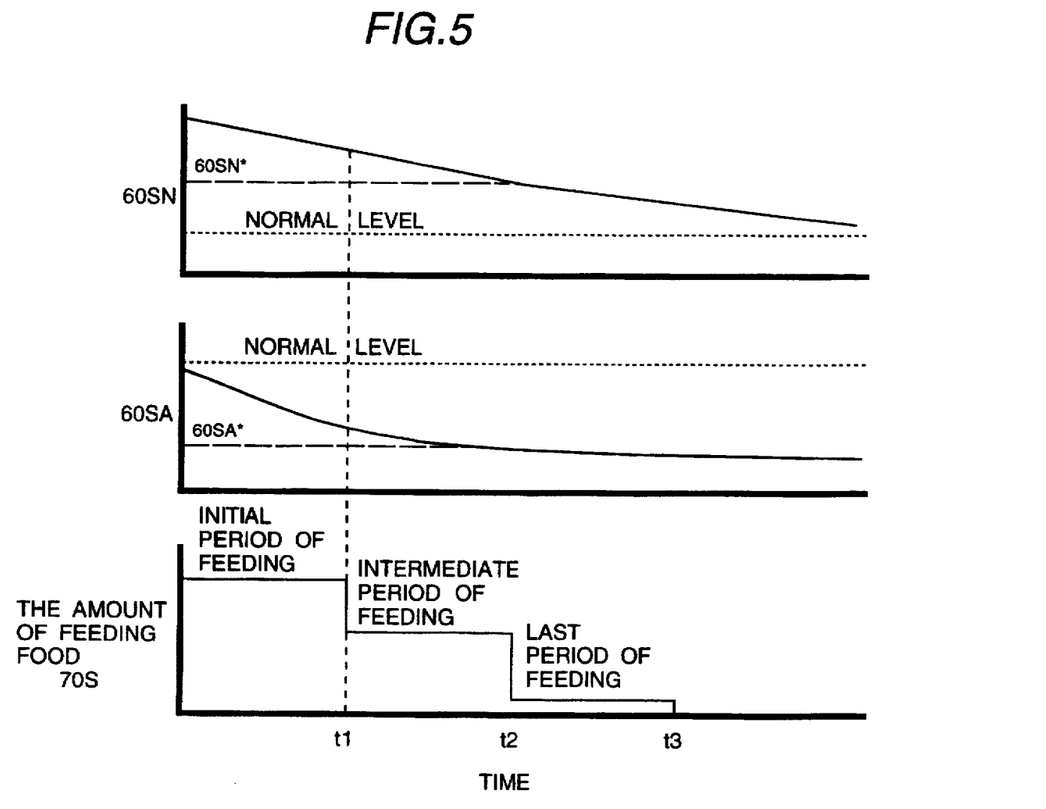
FIG. 5 is a graph indicating the total number of the wave forms, the total area of the wave forms, and total feeding amount of food.

In accordance with the present embodiment, the amount of feeding food and the feeding time are controlled corresponding to the total number of the wave forms 60SN or the total area of the wave forms 60SA, and the amount of feeding food 70S is decreased stepwise as shown in FIG. 5, and terminated finally. However, the feeding may be also terminated by previously setting preset values, 60SA* and 60SA*, for the total number of the wave forms 60SN and the total area of the wave forms 60SA, in the feeding amount control means 70, and operating the feeding amount control means 70 to terminate the feeding when respective of the total number of the wave forms 60SN and the total area of the wave forms 60SA is decreased below the respective of the preset values, 60SA* and 60SA*. Frequency of the feeding is generally decided to be once a day. However, the feeding of several times a day can be performed, if the fishes require more food, by utilizing the feeding control using the preset values, 60SA* and 60SA*.

In accordance with the present embodiment, the total number of the wave forms 60SN and the total area of the wave forms 60SA are taken as indexes indicating a degree of food requirement of fishes 10, the movement for taking food of fishes 10 induced by the requirement (an amount of moving for taking food), and variation of the movement of fishes 10 for taking food due to decrease in the requirement for food (decrease in food requirement) of fishes 10. However, either one of the total number of the wave forms 60SN or the total area of the wave forms 60SA can be taken as an index indicating a degree of food requirement of fishes 10, the amount of moving for taking food, and the decrease in food requirement.

In accordance with the present embodiment, the amount of feeding food 70S is decreased stepwise corresponding to the degree of the total number of the wave forms 60SN or the total area of the wave forms 60SA as shown in FIG. 5, and the feeding is terminated finally. However, the amount of feeding food can be decreased gradually, and the feeding is terminated finally.

In a case of the present embodiment, when the number and the size of the fishes 10 can not be determined directly, the amount of feeding food can be adjusted by inputting signals relating to the number and the size of the fishes 10 to the feeding amount control means 70 from an external source.

Figure 6:
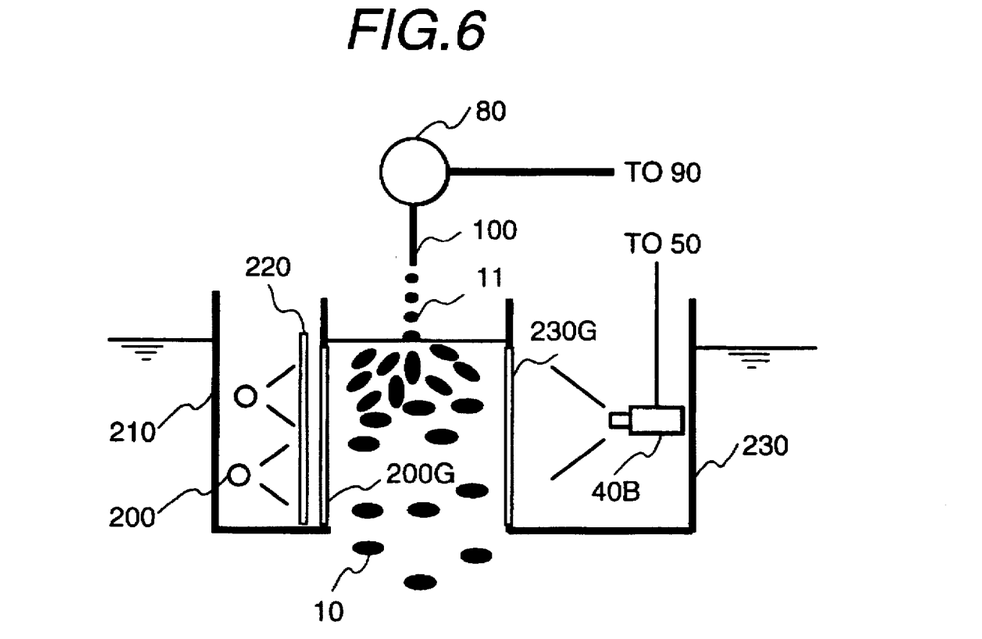
FIG. 6 is a schematic drawing indicating a certain part of composition of another embodiment of the present invention.

FIG. 6 indicates a partial composition of another embodiment of the present invention. A whole composition of an automatic feeding apparatus for cultivated fishes is as same as the embodiment shown in FIG. 1 except replacing the image acquisition means 40A in FIG. 1 with the image acquisition means 40B in FIG. 6. That is, in comparison with the embodiment shown in FIG. 1, which is featured in taking images of the wave at surface of the water and calculating the degree of waving, the present embodiment is featured in taking images of the fishes in water from a horizontal direction, and calculating a distribution of fishes in a depth direction and a degree of the moving velocity of the fishes into values.

In FIG. 6, the numeral 200 indicates an illuminating means, 210 is an illumination installing means for installing the illuminating means 200 composed partly of transparent material 200G such as glass and others, 220 is an illumination uniforming means for illuminating light, 230 is an image acquisition apparatus installing means for installing the image acquisition means 40B composed partly of transparent material 230G such as glass and others, the image acquisition means 40B is connected to the image processing means 50, and the feeding means 80 is connected to the feeding food tank 90.

The illuminating light from the illuminating means 200 is projected into the water via the illuminating light uniforming means 220 to light up the fishes 10. The image acquisition means 40B takes the image of the fishes 10, and the image is processed by the image processing means 50.

Operation of the present embodiment is explained referring to a flow chart shown in FIG. 7, hereinafter.

Figure 7:
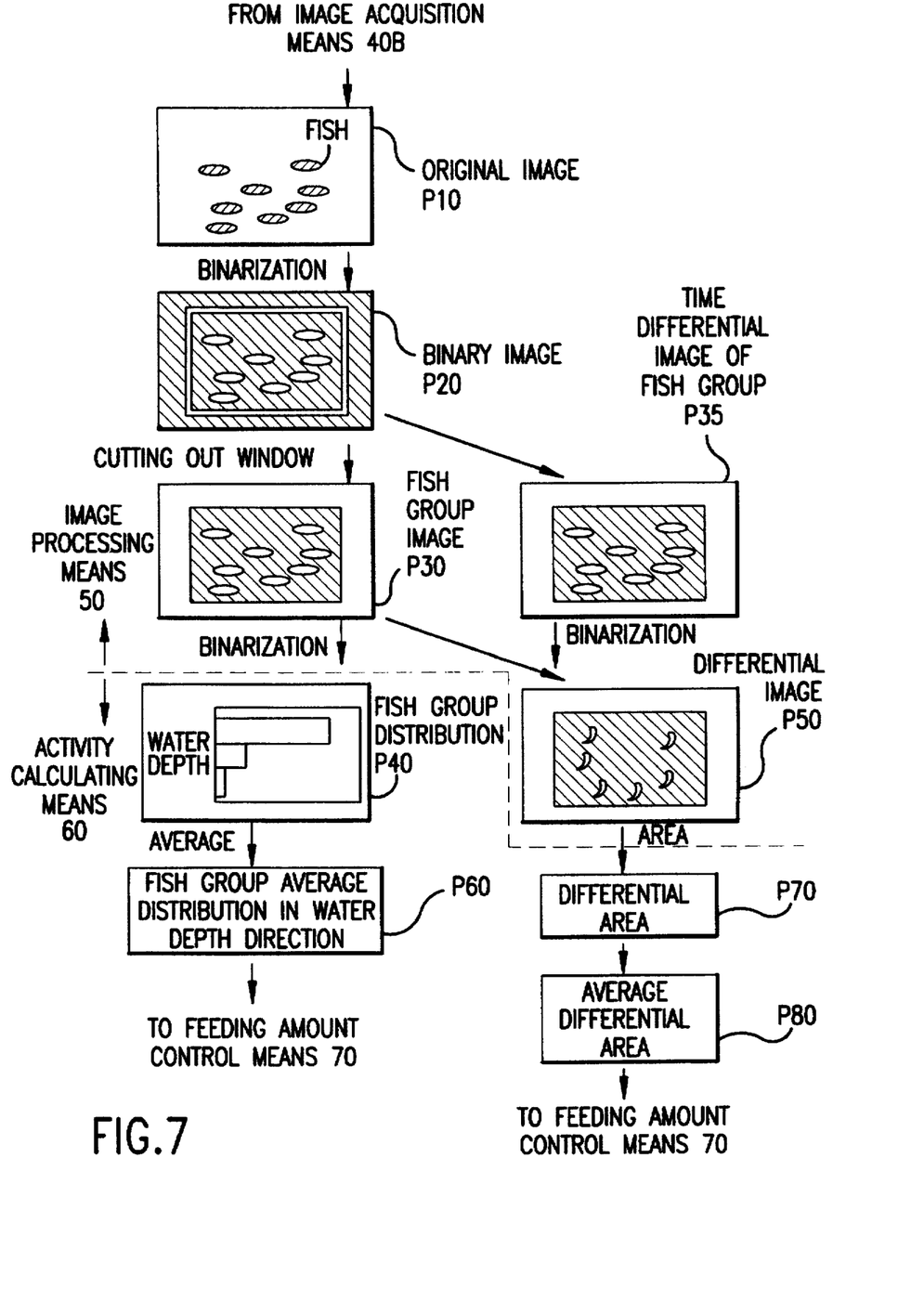
FIG. 7 is a schematic flow of the processes of the present invention.

The image of the fishes 10 are taken as shown in an original image P10 of FIG. 7, wherein the fishes 10 is in black and the background is in white. Because, the illuminating light from the illuminating means 200 is uniformed by the illuminating light uniforming means 220, and the background is bright and the fishes are dark when an image is taken by the image acquisition means 40B. In accordance with the present method, an advantage is achieved that the fishes 10 are always taken dark even if the water is cloudy. Furthermore, another advantage is realized that the fishes 10 can be recognized as dark bodies irrelevant to their color.

The image processing means 50 calculates the original image P10 obtained by the image acquisition means 40B into binary values for obtaining the binary image P20. In the original image P10, the fishes are taken dark and the background is taken bright as previously described. In the present embodiment, the dark portion (i.e. expressing fishes) in the P10 is designated by "1", and the bright portion (i.e. expressing background) is designated by "0". For convenience in illustration, correspondence of darkness and brightness with the numerals "1" and "0" are made reverse to the embodiment shown in FIG. 1. The image P20 is obtained by calculating to binary image for expressing reversely as "1" for white and "0" for black, and the white expresses the fishes and the black expresses the background. A rectangular window is indicated in the binary image P20. The window designates an image region desired for processing, and the window can naturally designate the image region onto the original image P10. A fish group image P30 is obtained from the image in the window of the binary image P20 at time is zero. In accordance with the fish group image P30, respective position of fishes 10, particularly, a distribution of the fishes in the depth direction can be determined. In the present embodiment, the operation for obtaining the fish group image P30 from the original image P10 is repeated at a definite interval, such as every 0.1 second. And a fish group time differential image P35 after 0.1 second is obtained from the binary image P20. The above operation is repeated every 0.1 second. Furthermore, a differential image P50 is obtained from the fish group image P30 and the fish group time differential image P35. In the differential image, white portions expresses the portion where the value becomes 1 by differentiation. The "differentiation" means an operation for obtaining difference of the fish group image P30 from the fish group time differential image P35. Practically, executing a subtraction between respective corresponding picture elements in the images. Because the binary image has only values of 0 or 1, results of the subtraction are only 0, 1, or −1. The value 0 means that the portions in the P30 and the P35 have not been changed, and the values 1 or −1 mean that the portion has changed during 0.1 second, that is, the portion has been moved. If many portions have been moved, the picture elements having numerals other than 0 are increased.

In accordance with the present embodiment, the white portion in the differential image P50 expresses the portion where the value becomes 1 by the differentiation. Therefore, if the white portion occupies a large percentage of the area, the image expresses active movement of the fishes 10, and contrary, if the white portion occupies a small percentage of the area, the image expresses non-active movement of the fishes 10.

Subsequently, the activity calculating means 60 makes the activity of the fish group quantitative based on the result obtained by the image processing means 50. The activity calculating means 60 calculates a distribution of white portions (expressing fishes) in a depth direction from the fish group image P30, and obtains a distribution of the fish groups in the depth direction P40. A fish group average distribution in the depth direction P60 can be obtained by integrating the fish group distribution in the depth direction P40 of every 0.1 second for a designated period such as one minute. The left column in FIG. 8 expresses the fish group average distributions in the depth direction P60 by indicating the amount of fish groups in the abscissa and the depth of the water in the ordinate. The fish group average distribution in the depth direction P60 reveals that, when the food requirement of the fishes is high, i.e. at the initial period of feeding (taking food), the peak of the number of fish groups in the distribution locates near the surface of water, because the fishes move actively for taking food near the surface of water. Reversely, when the food requirement of the fishes is decreased, i.e. at the last period of feeding (taking food), the peak of the number of fish groups in the distribution locates near the bottom of water. At the intermediate period, the peak in the distribution locates at the middle region between the surface and the bottom of water. In accordance with the above described feature, the food requirement and the amount of food required by the fish groups can be determined.

The differential area P70 can be obtained by summing the area of the white portions in the differential image P50. Because the differential area P70 is obtained for every 0.1 second, the average differential area P80 can be determined by taking an average of the differential area P70 during a designated period, for instance one minute. The right column in FIG. 8 expresses the average differential area distribution by indicating the differential area P70 in the abscissa and the frequency in the ordinate. The average value of the above distribution is the average differential area P80. The average differential area P80 reveals that, at the initial period of feeding (taking food), the frequency of appearing the large differential area P70 is increased, and reversely, at the last period of feeding (taking food), the frequency of appearing the small differential area P70 is increased. At the intermediate period, the frequency of appearing the intermediate differential area P70 is increased. In accordance with the above described feature, the degree of the food taking movement of the fish groups can be determined.

The fish group average distribution in the depth direction P60 and the average differential area P80 obtained as explained above are input into the feeding amount control means 70 as the activity signal 60S. The feeding amount control means 70 outputs the feeding amount signal 70S based on the activity signal 60S and the cultivation environment measuring signal 110S. The feeding means 80 supplies food 11 to fishes 10 in the cultivating means 20 from a feeding food tank 90 via a feeding pipe 100 by receiving the feeding amount signal 70S.

Figure 8:
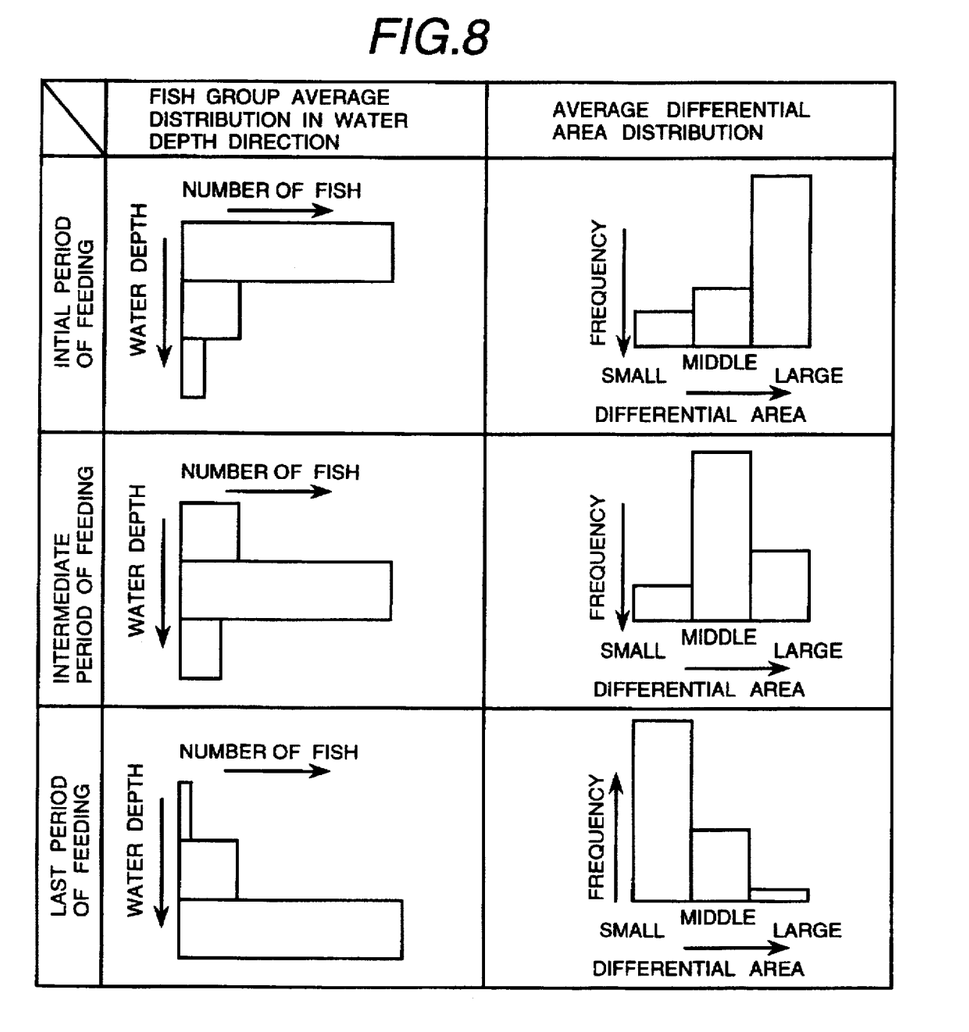
FIG. 8 is a drawing indicating a fish group average distribution in a depth direction and an average differential area distribution.

In accordance with the present embodiment, the fish groups move to deeper portion in water with elapsing the feeding (food taking) time as shown in FIG. 8 as the fish group average distribution in the depth direction P60, and the activity of the fishes is decreased gradually to be non-active as shown as the average differential area P80. Therefore, the amount of feeding food 70S is decreased stepwise as explained relating to FIG. 5, and finally the feeding is terminated. In this case, the amount of feeding food and the feeding time are controlled corresponding to the fish group average distribution in the depth direction P60 or the average differential area P80. The faster the peak moves to the deeper portion in the fish group average distribution in the depth direction P60, or the average differential area P80 decreases, the sooner the feeding is terminated.

In accordance with the present embodiment, feeding the fishes can be performed always appropriately by calculating the fish group distribution in the water depth direction and the activity of the fishes, which are varied corresponding to variation in the food requirement of the fishes, the movement of the fishes for taking food induced by the food requirement, and variation in food taking movement of the fishes in accordance with decrease in the food requirement of the fishes, to binary images such as light and shade images by the image processing, calculating the activity of the fishes for taking food to values based on the binary images, and adjusting the amount of feeding food based on season, cultivating environment, growth degree of the fishes such as number and size of the fishes, and other conditions.

As the result, as same advantages as the embodiment shown in FIG. 1 can be achieved.

In the present embodiment, the fish groups image P30 is obtained from the binary image P20 of the image processing means 50, and the number and size of the fishes are determined based on the fish groups image P30. Then, the feeding amount signal 70S in the embodiment shown in FIG. 1 is corrected corresponding to the above number and size of the fishes.

In accordance with the present embodiment, the fish group distribution in the water depth direction and the activity of the fishes are used as indexes for indicating a degree of the food requirement (food requirement) of fishes 10, the movement of the fishes for taking food (food taking movement) induced by the food requirement, and variation in food taking movement of the fishes (decreases in food requirement) in accordance with decrease in the food requirement of the fishes. However, either one of the fish groups distribution in the water depth direction or the activity of the fishes can be used as indexes for food requirement, the food taking movement, and the decrease in food requirement of the fish 10.

The above embodiments are explained taking the fish as an example, but the present invention can be applied to feeding other aquatic life such as crustacean, zooplankton, and others.

In accordance with the present invention, an appropriate amount of food can be always fed, a percentage of fishes which took the food is increased, cost of the food is decreased, feeding work can be performed efficiently, and environmental water pollution can be mitigated, because feeding is performed based on the values which are obtained by image analysis of variation in the degree of requiring for food (food requirement), food taking activity induced by the food requirement, and variation in food taking activity with decrease in food requirement of the aquatic life.

Furthermore, operator's labor for feeding the aquatic life can be decreased, and the feeding operation can be performed efficiently, because the amount of feeding food and the feeding time are controlled automatically corresponding to the variation in food taking movement of the aquatic life.

Furthermore, preferable growth of the aquatic life becomes possible, because the feeding of a several time per day can be performed as much as the aquatic life requires by calculating the activity of the aquatic life to values and the feeding is controlled by comparing the activity with a designated preset value.

What is claimed is:

1. An automatic feeding apparatus for aquatic life comprising:
   a cultivating means for cultivating the aquatic life, and
   a feeding means for supplying food, which further comprises:
      an image acquisition means for taking a behavioral patterns of said aquatic life as an image,
      an image processing means for processing the image to a binary image,
      an activity calculating means for calculating the activity of said aquatic life based on result of the image processing, and
      a feeding amount control means for controlling feeding amount and feeding time of the feeding means based on said activity.

2. An automatic feeding apparatus for aquatic life as claimed in claim 1, wherein
   an image of wave forms at surface of water is taken,
   a binary image is calculated from said image of wave forms, and
   a value indicating the activity of said aquatic life is calculated by calculating a total number and/or a total area of the wave forms from said binary image.

3. An automatic feeding apparatus for aquatic life as claimed in claim 1, wherein
   the activity of said aquatic life is taken as a behavioral pattern of said aquatic life in water, and
   a value indicating the activity of said aquatic life is calculated based on a distribution of said aquatic life in a depth direction and/or a degree of movement of said aquatic life.

4. An automatic feeding apparatus for aquatic life comprising:
   a cultivating means for cultivating the aquatic life, and
   a feeding means for supplying food, which further comprises:
      an image acquisition means for taking an image of wave forms at surface of water in said cultivating means,
      an image processing means for processing the image of the wave forms at surface of water to a binary image,
      an activity calculating means for calculating a value indicating the activity of said aquatic life by calculating a total number and/or a total area of the wave forms based on said binary image, and
      a feeding amount control means for controlling feeding amount and feeding time of the feeding means based on a comparison of said value with a preset total number of the wave forms and/or a preset total area of the wave forms.

5. An automatic feeding apparatus for aquatic life as claimed in claim 1, which further comprises:
   a cultivating environment measuring means for determining cultivation environment, and/or a measuring means for determining number and size of said aquatic life, wherein
   an amount of feeding food is controlled in accordance with the cultivation environment, and/or the number and the size of the aquatic life.

6. An automatic feeding apparatus for aquatic life as claimed in claim 5, wherein
   said number and size of the aquatic life are determined by the steps of:
      taking a behavioral pattern of the aquatic life in water of the cultivating means as an image,
      calculating a binary image from said image by image processing,
      calculating an image of the aquatic life groups based on said binary image, and
      said number and size of the aquatic life are calculated from said image of the aquatic life groups.

7. An automatic feeding method for feeding aquatic life in cultivating the aquatic life, comprising the steps of:
   taking a behavioral pattern of said aquatic life as an image,
   calculating a binary image from said image by image processing,
   calculating a value indicating activity of said aquatic life from said binary image, and
   controlling feeding amount and feeding time based on said value.

8. An automatic feeding method for feeding aquatic life as claimed in claim 7, wherein said feeding amount is adjusted based on cultivation environment and/or number and size of the aquatic life.

9. An automatic feeding method for feeding aquatic life as claimed in claim 8, wherein said number and size of the aquatic life are determined by the steps of:

taking a behavioral pattern of said aquatic life in water as an image, calculating a binary image from said image by image processing, calculating an image of the aquatic life groups based on said binary image, and calculating said number and size of the aquatic life from said image of the aquatic life groups.

10. An automatic feeding method for feeding aquatic life in cultivating the aquatic life, comprising the steps of:

taking an image of wave forms at surface of water in an aquafarm, wherein the aquatic life is cultivated, calculating a binary image from said image of the wave forms by image processing, calculating a value indicating activity of said aquatic life by calculating a total number of the wave forms and/or a total area of the wave forms from said binary image of the wave forms, and controlling feeding amount and feeding time based on said value.

11. An automatic feeding method for feeding aquatic life in cultivating the aquatic life, comprising the steps of:

taking a behavioral pattern of said aquatic life in water as an image indicating activity of said aquatic life, calculating a binary image from said image by image processing, calculating a value indicating the activity of said aquatic life by calculating a distribution of said aquatic life in a depth direction and/or a degree of movement of said aquatic life from said binary image, and controlling feeding amount and feeding time based on said value.

12. An automatic feeding method for feeding aquatic life in cultivating the aquatic life, comprising the steps of:

taking an image of wave forms at surface of water in an aquafarm, wherein the aquatic life is cultivated, calculating a binary image from said image of the wave forms by image processing, calculating a value indicating activity of said aquatic life by calculating a total number of the wave forms and/or a total area of the wave forms from said binary image of the wave forms, and controlling feeding amount and feeding time based on a comparison of said value with a preset total number of the wave forms and/or a preset total area of the wave forms.

* * * * *

UNITED STATES PATENT AND TRADEMARK OFFICE
CERTIFICATE OF CORRECTION

PATENT NO. : 5,732,655
DATED : March 31, 1998
INVENTOR(S) : Akira MIYASHIRO ET AL.

It is certified that error appears in the above-identified patent and that said Letters Patent is hereby corrected as shown below:

THE TITLE PAGE: After "[73] Assignee: Hitachi, Ltd., Tokyo, Japan" add --Nippon Suisan Kaisha, Ltd., Tokyo, Japan--.

IN THE ABSTRACT: Line 14, change "110 , 40B" to --110, 40B--.

| Column | Line | |
|---|---|---|
| 1 | 27 | Delete "main cultivated"; after "fishes" insert --mainly cultivated--. |
| 1 | 32 | Change "decreasing the" to --a decreasing--. |
| 1 | 36 | Change "to take" to --taking--; after "even" insert --when--. |
| 1 | 38 | After "fishes" change "with" to --while--. |
| 1 | 52 | Change "width" to --range--. |
| 1 | 54 | After "respective" delete "of the". |
| 1 | 55 | Change "of the fishes" to --by the fishes--. |
| 2 | 7 | Change "of the aquatic life which took" to --at which the aquatic life takes--. |
| 2 | 45 | Change "calculating" to --processing--. |
| 2 | 56 | Change "calculating" to --processing--. |

UNITED STATES PATENT AND TRADEMARK OFFICE
CERTIFICATE OF CORRECTION

PATENT NO. : 5,732,655
DATED : March 31, 1998
INVENTOR(S) : Akira MIYASHIRO ET AL.

It is certified that error appears in the above-identified patent and that said Letters Patent is hereby corrected as shown below:

| Column | Line | |
|---|---|---|
| 2 | 60 | Change "with controlling" to --by controlling--. |
| 3 | 16 | Change "of cultivating means" to --in the cultivation area--. |
| 4 | 49 | Change "irrelevant to" to --suitable for--. |
| 4 | 67 | Change "values" to --value--. |
| 5 | 3 | Change "FIG. 2o" to --FIG. 2.-- |
| 5 | 7 | Change "values" to --value--. |
| 5 | 63 | Change "Reversely" to --Conversely--. |
| 7 | 4 | Change "decrease" to --decreases--. |
| 7 | 12 | Change "elapsing" to --elapse of--. |
| 7 | 26 | Change "which is" to --which are--. |
| 7 | 37 | Change "cost of the" to --the cost of--. |
| 7 | 39 | Change "prevented" to --protected--. |
| 7 | 54 | Change "**60SA*'" to --60SN*'**--. |
| 7 | 58 | Delete "respective of". |
| 7 | 60 | Change "the respective of" to --their respective--. |
| 7 | 61 | Before "preset" delete "the"; change "60SA* and" to --60SN* and--. |

UNITED STATES PATENT AND TRADEMARK OFFICE
CERTIFICATE OF CORRECTION

PATENT NO. : 5,732,655
DATED : March 31, 1998
INVENTOR(S) : Akira MIYASHIRO ET AL.

It is certified that error appears in the above-identified patent and that said Letters Patent is hereby corrected as shown below:

| Column | Line | |
|---|---|---|
| 7 | 65 | Change "60SA* and" to --60SN* and--. |
| 8 | 17 | After "decreased" insert --more--. |
| 8 | 27 | Change "is as same" to --is the same--. |
| 8 | 28 | Change "replacing" to --that it replaces--. |
| 8 | 57 | Change "fishes 10 are" to --fishes 10 is--. |
| 8 | 58 | Change "fishes 10 is" to --fishes 10 are--. |
| 9 | 4 | Delete "taken". |
| 9 | 12 | After "calculating" change "to" to --a--; delete "for". |
| 9 | 13 | Change "reversely as" to --conversely--. |
| 9 | 35 | Change "P35. Practically," to --P35; in other words,--. |
| 10 | 25 | Change "appearing" to --the appearance of--. |
| 10 | 27 | Change "appearing" to --the appearance of--. |

UNITED STATES PATENT AND TRADEMARK OFFICE
CERTIFICATE OF CORRECTION

PATENT NO. : 5,732,655
DATED : March 31, 1998
INVENTOR(S) : Akira MIYASHIRO ET AL.

It is certified that error appears in the above-identified patent and that said Letters Patent is hereby corrected as shown below:

| Column | Line | |
|--------|------|---|
| 10 | 29 | Change "appearing" to --the appearance of--. |
| 10 | 44 | Change "elapsing" to --elapse of--. |
| 11 | 47 | Change "a several time" to --several times--. |
| 11 | 58 | After "taking" delete "a". |

Signed and Sealed this

First Day of August, 2000

Attest:

Q. TODD DICKINSON

*Attesting Officer*     *Director of Patents and Trademarks*